United States Patent [19]

Ball

[11] Patent Number: 5,396,506
[45] Date of Patent: Mar. 7, 1995

[54] COUPLED MULTIPLE OUTPUT FIBER LASER

[75] Inventor: Gary A. Ball, Simsbury, Conn.

[73] Assignee: United Technologies Corporation, Hartford, Conn.

[21] Appl. No.: 165,141

[22] Filed: Dec. 9, 1993

[51] Int. Cl.⁶ ............................................. H01S 3/30
[52] U.S. Cl. ........................................ 372/6; 372/18; 385/15; 385/24; 385/28; 385/39
[58] Field of Search ........................... 372/6, 108, 118; 385/15, 24, 27, 28, 31, 32, 39, 47, 49

[56] References Cited

U.S. PATENT DOCUMENTS

| | | | |
|---|---|---|---|
| 4,896,324 | 1/1990 | Ball et al. | 372/18 |
| 5,113,244 | 5/1992 | Curran. | |
| 5,134,620 | 7/1992 | Huber | 372/6 |
| 5,136,420 | 8/1992 | Inagaki et al. | 372/6 |
| 5,138,675 | 8/1992 | Schofield | 385/28 |
| 5,165,104 | 11/1992 | Weverka | 385/24 |
| 5,179,603 | 1/1993 | Hall et al. | 385/24 |

*Primary Examiner*—Georgia Y. Epps
*Attorney, Agent, or Firm*—Gerald L. DePardo

[57] ABSTRACT

A coupled multiple output fiber laser includes a plurality of laser diodes 10,50-56 each providing pump light 12,58-64 which is incident on respective Bragg gratings 16,74-80 which pass the pump wavelength and reflect a lasing wavelength. The fibers 20,90-96 are doped with a gain dopant such as $Er^{3+}$ to provide lasing at the lasing wavelength in response to the pump light. Light beams 18,82-88 are incident on an optical coupler 22 which couples the light beams 18,82-88 to the light beams 40-48 on the fibers 30-38 based on a predetermined power distribution, e.g., equal distribution. The light 40 travels along the fiber 30 which acts as a common-cavity fiber. The light 40 reflects off a reflector 120 which provides reflected feedback light 122 which reenters the coupler 22 and is distributed to the individual cavity fibers 20,82-88 based on the same or a different predetermined power distribution. Output light 42-48 is provided on the fibers 32-38 which may be incident on a lens 160 to cause the beams to intersect. The length of each of the fibers 20,90-96 is adjusted by piezoelectric tuners 200-208 to provide coupled cavity phase-locking of the output beams 42-48. Also, each of the output beams 42-48 may be phase shifted by additional tuners 240-246. An additional output beam may be obtained by a light 232 which passes through the mirror 120.

19 Claims, 3 Drawing Sheets

COUPLED MULTIPLE OUTPUT FIBER LASER

TECHNICAL FIELD

This invention relates to fiber lasers and more particularly, to coupled multiple output fiber lasers.

BACKGROUND ART

In nearly all laser systems, the amount of output power achievable is limited primarily by the amount of available gain as well as the thermal effects on the system. However, it is known in the art of lasers and resonators that a plurality of individual lasers may be coupled together to provide a resultant intensity at a given target point which is greater than a simple sum of the individual lasers, as is discussed in co-pending U.S. patent application, Ser. No. 07/955,810, filed Oct. 2, 1992, entitled "Scalable Laser System Using a Coupled Multiple Output Resonator" now U.S. Pat. No. 5,289,492.

In particular, it is known in the field of high-powered lasers that if N individual uncoupled lasers, each having a single output and sufficient reflected feedback light (called self-feedback) to sustain lasing action, are each focused on a distant target, the peak intensity seen at the target will be equal to $N \times I$; where N is the number of lasers and I is the intensity of a single laser. However, if the N lasers are coupled, i.e., phase locked and running at the same frequency or mode, such that the phase between output beams is constant, and they are in-phase with each other at the target, the intensity seen at the target will be $N^2 \times I$ (i.e., the coherent sum).

However, to maintain phase-lock for multiple cavities, the cavity length of each laser must be kept substantially within an integer multiple of the lasing wavelength of each of the lasers. How closely this requirement must be met depends on the number of lasers and the type of coupling used. However, it is difficult to achieve this level of cavity length matching, due to vibration and thermal effects and because (for high power lasers) it requires precisely controlling very large mirrors.

Another way of achieving $N^2I$ output intensity is to use a single long laser cavity (not individual lasers), such as a folded cavity, and tap-off output beams from various different locations in the cavity. Such a laser is called a multiple output resonator (or laser) or MOR, as is known.

In the area of optical fiber lasers, the maximum amount of gain available is much less than that available for open air cavities. Furthermore, the aforementioned techniques are not readily applicable in the area of optical fiber lasers. Consequently, to date, the art has not successfully coupled individual fiber lasers to provide a higher power scalable fiber laser system.

DISCLOSURE OF INVENTION

Objects of the invention include provision of a coupled multiple output fiber laser which has a plurality of fiber lasers coupled together and a plurality of outputs all of which are phase-locked and which allows for scalable output power.

According to the present invention a coupled multiple output fiber laser includes a plurality of individual optical cavity fibers which allow light to propagate therein; a plurality of reflection means are provided, each being disposed along a respective one of the plurality of individual cavity fibers, each for reflecting light at a lasing wavelength; a portion of each of the individual cavity fibers are doped with a predetermined gain dopant which allows lasing at the lasing wavelength and receiving pump light which excites the gain dopant to allow the lasing to occur; at least one output fiber and a common cavity fiber are provided; optical coupling means are connected to each output fiber, the common cavity fiber, and the individual cavity fibers, for receiving light from each of the individual fibers, for coupling a predetermined amount of the light in each of the individual fibers to at least one output fiber and to the common cavity fiber, based on a first predetermined power distribution, the light in each output fiber exiting as respective output light beams; common cavity reflection means are disposed along the common cavity fiber, for providing a predetermined amount of reflected feedback light at the lasing wavelength back along the common cavity fiber and back into the coupling means; the coupling means provides a distributed predetermined amount of the feedback light along each of the individual cavity fibers based on a second predetermined power distribution; and the distributed predetermined amount of the feedback light is incident on a corresponding one of the plurality of reflection means and the distributed predetermined amount of the feedback light which is at the lasing wavelength is reflected by the corresponding reflection means, thereby creating a plurality of coupled laser cavities each cavity comprising one of the plurality of reflection means and the common reflection means, each cavity lasing at the lasing wavelength, and each of the output beams being phase-locked; the output beams comprising light from at least one output fiber and light either from the common cavity fiber which is passed through the common cavity feedback reflection means or from another output fiber, or both.

According further to the present invention, laser pump means provide the pump light beams. According still further to the invention, fiber stretching means are provided for adjusting the length of at least one of the individual cavity fibers. Further according to the invention, the individual cavity fibers are single spatial mode fibers and the gain dopant is a rare-earth element.

The invention represents a dramatic improvement over prior art fiber lasers by providing a significant increase in power from that obtainable from a plurality of individual fiber lasers. The invention uses highly efficient fiber lasers having single mode fibers which provide excellent mode confinement properties, which act as both the laser cavity and the gain medium. Also, high quality low loss fiber couplers are used to minimize undesired cavity losses. Further, use of intracore Bragg reflectors, which are written directly into the fiber core, provide efficient cavity feedback and also aid in spectrally narrowing the lasing wavelength band, thereby allowing for narrow wavelength band output beams from the coupled laser system.

Furthermore, output light beams from a plurality individual output ports can be easily phased together to provide the desired $N^2I$ intensity on a distant target. Still further, simple hardware controls and feedback techniques may be employed to maintain phase locking between resonators. Also, the invention provides a total system output power which is scalable based upon the number of lasers used.

Moreover, the use of fusion splicing between fiber components and fiber pigtailed laser diode pumps, coupled with proper packaging of this integrated structure, yields a hardened system which is highly insensitive to misalignment.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
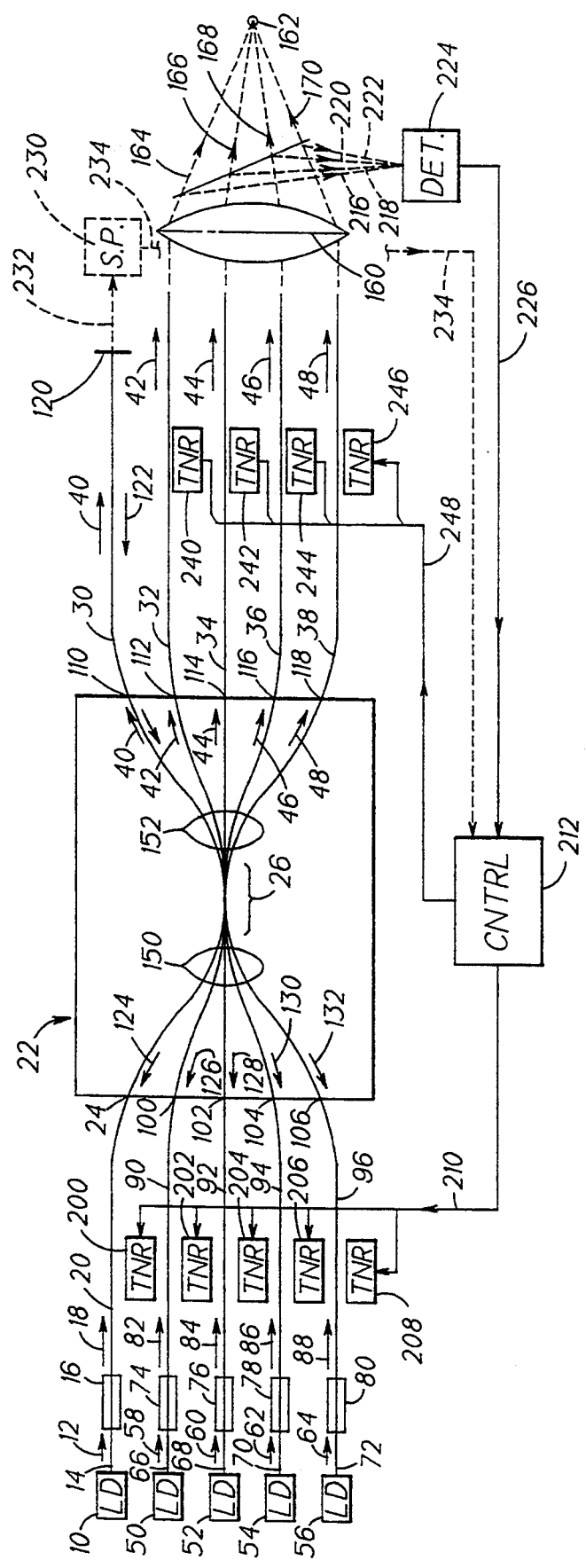
FIG. 1 is a schematic block diagram of a coupled multiple output fiber laser in accordance with the present invention.

Referring to FIG. 1, a laser diode 10, provides pump light 12 having a pump wavelength, e.g., 980 nanometers, onto an optical fiber 14. The laser diode 10 and the fiber 14 may likely be a known laser diode having a fiber pigtail. The pump light 12 propagates along the fiber 14 and is incident on an intracore fiber Bragg grating 16. The grating 16 reflects a predetermined amount of narrow wavelength band of light 18 centered at a predetermined lasing wavelength $\lambda l$ and passes the remaining wavelengths (including the pump wavelength) as light 18 along a doped fiber 20. The optical fiber 20 is a rare-earth-doped single transverse (spatial) mode fiber, e.g., an erbium-doped silica core fiber. Such dopant provides a gain medium for a fiber laser and acts as a portion of a laser cavity. The fibers 14,20 may be one continuous doped fiber with the Bragg grating 16 written (or impressed) in its core, or they may be separate optical components that are spliced together. The pump light portion of the light 18 excites the gain medium in a known way, thereby providing the excited atoms necessary for the known lasing action to occur. Because the fiber 20 is single spacial mode fiber, only a single transverse mode will lase.

There may be a lens (not shown) between the laser diode 10 and the fiber 14 to aid in injecting the source light 12 from the laser diode 10 into the fiber 14. Also, other techniques of pumping the fiber laser may be used if desired, e.g., pumping from the side of the fiber 20 either directly or by use of a wavelength demultiplexer or coupler, so as to couple the pumping light 12 into the doped fiber 20.

The doped fiber 20 is fed to a known 5×5 coupler 22 at a port 24. The coupler 22 couples a plurality of fibers together in an known way and distributes light from each fiber, based on a predetermined power distribution (discussed hereinafter).

The light 18 enters a junction 26 in the coupler 22, which distributes the light 18 to a plurality of fibers 30–38, as indicated by the arrows 40–48, based on a predetermined power distribution. For example, the power of the light 18 may be distributed into five equal parts. In that case, the beams 40–48 each comprise 20% of the beam 18. The fibers 30–38 are single mode optical fibers. None, some, or all of the fibers 30–38 may be doped to provide additional gain if desired.

However, the ends of the fibers 32,34,36,38 from which the light beams 42–48 exit should be designed to minimize the amount of feedback light along the output fibers 32–38 so as to not destabalize the coupled resonator. For example, coating the end of the fiber with a non-reflective coating or placing a medium-matching bubble or bead at the end may suffice.

A similar arrangement exists for laser diodes 50–56 (similar to the laser diode 10), which provide pump light signals 58–64 into fibers 66–72 which are incident on associated Bragg gratings 74–80, similar to the grating 16. Associated pump light 82–88 is provided on rare-earth-doped fibers 90–96 similar to the fiber 20. Instead of the Bragg gratings 16,74–80, any reflective elements may be used if desired.

The fibers 90–96 are fed to the coupler 22 at the ports 100–106. The light 82–88 enters the coupler 22 along the fibers 90–96 at the ports 100106 along with the light 18 which enters along the fiber 20 at the port 24. The power of each of the light beams 18,82–88 is divided, as discussed hereinbefore, based on a predetermined division of power, e.g., equal distribution or 20%, along each of the fibers 30–38. Thus, the light 40 exiting the junction 22 on the fiber 30 has a power equal to one-fifth (20%) of the power of each of the beams 18,82–88 entering the coupler 22. Other power distributions may be used if desired. The light beams 40–48 exit the coupler 22 from ports 110–118 along the fibers 30–38, respectively.

The light 40 propagates along the fiber 30 and is incident on a reflective mirror 120, which provides a reflected light beam 122. The mirror 120 reflects enough light to allow lasing at a lasing wavelength $\lambda l$ to occur (and to allow coupling of multiple lasers; discussed hereinafter). Instead of the mirror 120, a Bragg grating (not shown) may be used if desired. Alternatively, the end of the fiber 30 may have a high fidelity cleaved end face which provides Fresnel reflection. Any other reflective element or coating which provides sufficient feedback and coupling back to the resonator may be used if desired.

The reflected light 122 travels along the fiber 30 and re-enters the coupler 22 at the port 110 from right side thereof. In a similar fashion to the way the light beams 18,82–88 were divided into five parts, the return beam 122 is divided into five equal parts indicated as light beams 124–132 out of the left side of the junction 26 that exit from the ports 24,100–106 of the coupler 22 and propagate along the associated gain-doped fibers 20,90–96, respectively.

The light 124 is incident on the fiber grating 16. The grating 16, as discussed hereinbefore, reflects a predetermined narrow wavelength band of light centered at a reflection wavelength which is also the lasing wavelength $\lambda l$, thereby reenforcing a portion of the light 18 at $\lambda l$ and creating a laser resonator cavity between the mirror 120 and the grating 16. The gain medium in the fiber 20 provides sufficient gain to allow lasing to occur in the cavity delimited by the reflectors 16,120 at the lasing wavelength $\lambda l$. The lasing wavelength $\lambda l$, as is known, is determined by the optical length of the cavity, the gain medium, and the reflectors delimiting the laser cavity.

Similarly, a laser resonator is formed between: the Bragg grating 74 and the mirror 120; the Bragg grating 76 and the mirror 120; the Bragg grating 78 and the mirror 120; and the Bragg grating 80 and the mirror 120. Consequently, the reflected light 122 from the mirror 120, which re-enters the coupler 22, is the feedback light for the aforementioned five resonator cavities and is made up of one-fifth of the cavity light from each of these resonators. Therefore, the five resonator cavities each have a common feedback mirror 120, a common cavity section (the fiber 30), and a portion of light from each of the adjacent cavities, thereby creating a coupled resonator. It should be understood that the arrows 18,82–88 are used to indicate both the pump light which excited the gain medium and the light reflected within the cavity from each respective Bragg grating 16,74–80.

It should be understood that the waveguides 150,152 within the coupler 22 that feed the junction 26 are, in general, not doped; however, they may be if desired.

The light beams 42–48 exit the fibers 32–38 and are incident on a optical element 160, e.g., a redirecting focussing lens, which redirects and focusses the beams 42–48 as beams 164–170 which intersect at a predetermined target location 162 in the focal plane of the element 160. It should be understood that the optical element 160 is not essential to the invention and is merely illustrative of one way to combine the phase-locked beams. Thus, other or no optical elements may be used if desired.

As discussed hereinbefore, if each of the five lasers are lasing at the same wavelength $\lambda 1$, are all phase-locked and all in-phase with each other so that the output beams interfere constructively at the point 162 (also called the far field), the output intensity at the point 162 will be equal to $N^2 I$, where N is the number of lasers and I is the intensity for a given laser. For phase-lock to occur, the length of the cavities for each of the respective lasers must be kept to within approximately an integer multiple of the lasing wavelength $\lambda 1$ of each other. Therefore, for the output light beams 42–48 to all be phase-locked, each of the five laser cavities, i.e., the cavities delimited by the reflectors 16,120; the reflectors 74–120; the reflectors 76,120; the reflectors 78,120; and the reflectors 80,120, must all have substantially the same cavity length or be substantially within an integer multiple of the lasing wavelength of each other.

To achieve the needed cavity length matching, piezoelectric fiber stretchers or tuners 200–208 are attached to the fibers 20,90–96, respectively. The tuners 200–208 are driven by signals on lines 210 from a controller 212. Instead of tuners 200–208, heaters or other stretching devices may be used if desired. The controller 212 is of a known type and comprises such electronic computational and memory means as is necessary to perform the functions discussed herein. The detailed implementation of the controller is not critical to the invention.

To determine when each of the cavity lengths is within the desired tolerance, a beamsplitter 214 may be placed in the path of the beams 164–170. The beamsplitter deflects a predetermined portion of the beams 164–170 as beams 216–222 onto a detector 224 which monitors a point in space analogous to the point 162 (i.e., where the maximum in the interference pattern occurs). The detector provides an electrical signal on a line 226 to the controller 212 indicative of the optical power incident thereon. The controller 212 may then determine, using known techniques, whether the beams 164–170 are phase-locked, and drive the appropriate tuners 200–208 to adjust the cavity length of the associated cavity. When the output beams 164–170 are all phase-locked and in-phase at the target location 160, the output intensity seen by the detector will be a maximum.

Alternatively, a plurality of beamsplitters (not shown), one for each beam may be used to direct a portion of the output beam to the detector 224. Instead of a beamsplitter, one or more waveguides (not shown) attached to the fibers 32–38 may be used to tap-off a portion of the output beams to provide feedback signals to determine phase-lock. It should be understood that the beamsplitters may be placed to the left or right of the optical element 160.

Alternatively, or in addition to the output beam taps, a spectrophone 230 may be placed to the right of the mirror 120 to measure light 232 passing through the mirror 120, such as that discussed in U.S. Pat. No. 4,896,324, to Ball et al. A spectrophone, as is known, contains a gaseous medium whose optical absorption as a function of frequency has an absorption characteristic that can be varies with the optical frequency incident thereon. The spectrophone 230 also comprises a microphone which detects the level of absorption of the gaseous medium and provides an electrical output signal on a line 234 indicative of the resonator beam frequency. The electrical signal on the line 216 is fed to the controller 212 which determines which of the tuners 200–208 should be adjusted to provide phase-locking of the output beams 164–170. Alternatively, a coupler (not shown) may be attached to the fiber 30 to tap-off a portion of the beam 40.

Many different techniques exist in the art for performing such a tuning function. One technique to determine which cavity needs to be adjusted is to provide a dither signal having a different frequency for each of the tuners 200–208, such as that discussed in aforementioned Patent to Ball et al. In that case, frequency coupling of laser resonators is optimized by dithering each of the tuners at a different frequency, sensing a combined output beam with a spectrophone, and applying a predetermined algorithm to determine which laser is out of phase-lock.

Also, the amount of cavity feedback from the reflector 120 needed for phase-locking is less than 100% (as discussed hereinafter). In particular, with a 5×5, 20% equal distribution coupler, the amount of coupling existing with 100% cavity feedback by the mirror 120 is (0.2) (0.2)=0.04 or 4% (i.e., 20% of the laser power of a given laser is coupled into the feedback fiber 30 and 20% of that laser power is coupled back through the coupler 22 to another laser). Also, only a low percentage of coupling is needed to achieve phase-locking (as discussed hereinafter). Thus, using the light 232 passed through the reflective element 120 is a practical non-intrusive way to provide feedback to the controller.

Also, it should be understood that the light 232 may be used as an additional output beam if desired (discussed more hereinafter with FIG. 2).

If the output beams 164–170 are all phaselocked and in-phase, coherent interference will exist at the intersection of the beams 164–170 and a periodic interference pattern (standing wave) will exist at that region in space. This interference pattern is made up of peaks and valleys of intensity variations in space.

Also, to provide phase changes of the output light beams 42–48, thereby altering the angle of the wave front formed by the light waves 42-48, adjustable phase shifters (or output tuners) 240-246, similar to the tuners 200-208 discussed hereinbefore, may be provided. This allows the beams 42-48 to be steered in a desired direction. The phase modulators 240-246 may provide a fixed delay, e.g., by using a phase plate, or a variably controlled delay, e.g., by using a variable piezoelectric tuners, which stretch the fiber in response to signals on lines 248 from the controller 212. Also, the modulators 240-246 may be attached to the fibers 32-38, respectively, or placed between the fibers 32-38 and the lens 160, or placed to the right of the lens 160.

It should be understood that the output beams 42-48 as they exit the junction 26 within the coupler 22 (FIG. 1) are not only phase-locked but they are also in-phase because the output waveguides 152 (within the coupler 22) are all tapped from substantially the same point in the coupled fiber resonator which is part of the common cavity. However, depending on the optical path length of the output fibers 32-38 (which can be altered by the tuners 240-246; discussed hereinbefore), the beams 42-48 that exit the fibers 32-38 may or may not be in-phase.

Also, it should be understood that if a high amount of coupling exists between resonators, there is more tolerance allowed between cavity lengths before decoupling occurs. Similarly, if a small amount of coupling exists, the tolerances that are required for coupling are tighter and, thus, a more quick and accurate control scheme must be used to maintain more precise cavity length matching.

Figures 2, 3:
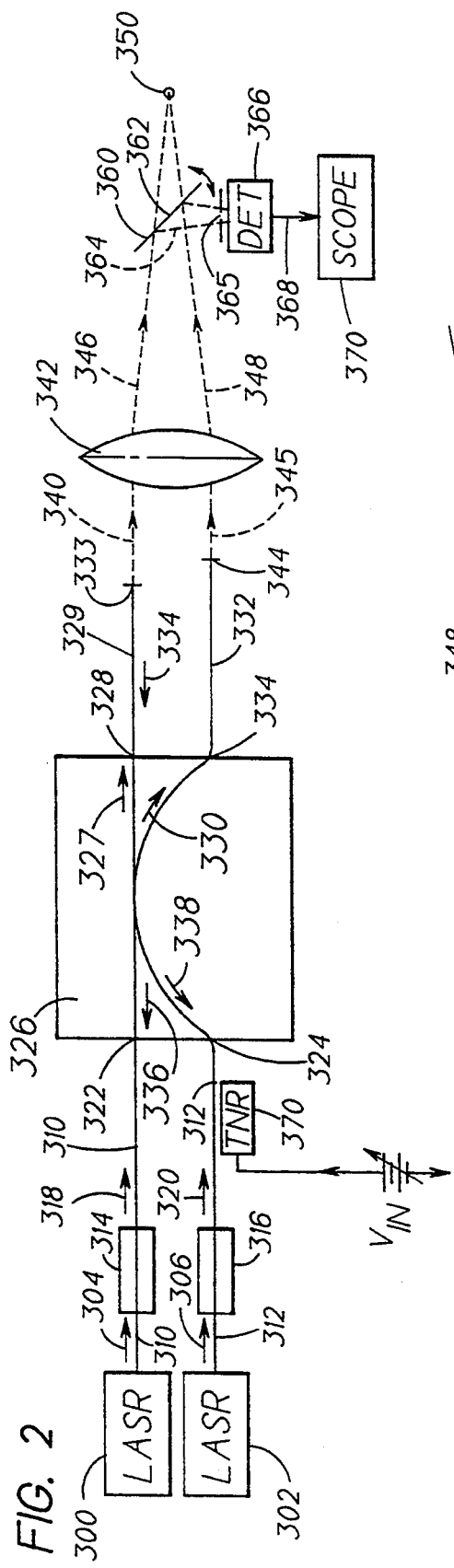
FIG. 2 is a schematic block diagram of an alternative embodiment of a coupled multiple output fiber laser in accordance with the present invention.
FIG. 3 is blown-up view of two fibers and an optical element of FIG. 2, showing more details of output beam, in accordance with the present invention.

Referring now to FIG. 2, in an alternative embodiment, two lasers 300,302 (e.g., TitaniumSapphire lasers), each having a pump wavelength of 980 nanometers (0.98 microns) and an output power level of about 51 milliwatts, provide pump light 304,306, onto fibers 310,312 having $Er^{3+}$ doped silica cores. Other dopants may be used if desired. The light beams 304,306 are incident on Bragg gratings 314,316, which are embedded within the core of the fibers 310,312, respectively. The gratings 314,316 reflect a predetermined amount, e.g., 88% and 95%, respectively, of a narrow wavelength band of light centered at a reflection and lasing wavelength $\lambda 1$ of about 1.55 microns and passes the pump light as light 318. The pump light 318 excites the doped fiber gain medium a known way so as to cause lasing at the lasing wavelength $\lambda 1$. Other amounts of reflection may be used if desired. The fibers 310,312 are about 3.3 meters in length and are fed to ports 322,324 of a known 2×2 coupler 326. Other fiber lengths may be used if desired.

The coupler 326 is a 70%/30% (cross/straight) coupler. Consequently, 30% of the light 318 is coupled (straight) as a light 327 which exits the coupler 326 from a port 328 on a fiber 329. Also, 70% of the light 318 is coupled (across) as a light 330 which exits the coupler 326 from a port 334 on a fiber 332. Symmetrically, 70% of the light 320 is coupled (across) to combine with the light 327 which exits the coupler 326 from the port 328 on the fiber 329. Also, 30% of the light 320 is coupled (straight) to combine with the output light 330 from the port 334 on the fiber 332.

An end 333 of the fiber 329 to the right of the coupler 326 has a high fidelity cleaved end face which reflects the incident light 327 as reflected light 334. The end face provides about 4% Fresnel reflection, thereby providing about 4% cavity feedback (in the shared-cavity fiber 329). With a 4% cavity feedback reflection from the reflective end face 333, a coupling of (0.70) (0.30) (0.04)=0.008, or 0.8% is achieved. We have found that this modest amount of coupling (0.8%) and cavity feedback (4%) is enough to provide phase locking.

The light 334 reenters the coupler 326 at the port 328 and is split 30/70 onto the fibers 310,312 as light beams 336,338, respectively. In particular, the light 336 is 30% of the light 334 and the light 338 is 70% of the light 334.

The light 336 propagates along the fiber 310, is incident on the Bragg grating 314, and is reflected and reinforces a portion of the light 318 at the lasing wavelength, thereby creating a laser cavity between the grating 314 and the reflective end face 333. The light 338 is incident on the Bragg grating 316 and is reflected and reinforces a portion of the light 320 at $\lambda 1$, thereby creating a laser cavity between the grating 316 and the reflective end face 333.

A portion of the light 327 that is not reflected as the light 334 is passed as light 340, exits the fiber 329, and is incident on an optical element 342, e.g., a redirecting collimating lens. An index matching fluid beaded on the end face 344 of the fiber 332 prevents the light 330 from being reflected back into the cavity, thereby preventing such feedback light from destabilizing the coupled resonator, as discussed hereinbefore.

The light 330 exits the fiber 332 as light 345 which is incident on the lens 342, which collimates the beams 340,345 as beams 346,348 which intersect at a predetermined location 350 (FIG. 3). It should be understood that use of the collimating lens 342 is merely for testing purposes to demonstrate that the invention works, actually the beams would likely be focussed on the target, as discussed hereinbefore with FIG. 1.

Referring now to FIG. 3, the divergent light beams 340,344 that exit the fibers 329,332 are indicant on the lens 342. The lens 342 provides the collimated beams 346,348 which intersect at a region 352 where the aforementioned interference pattern exists in space.

Figure 4:
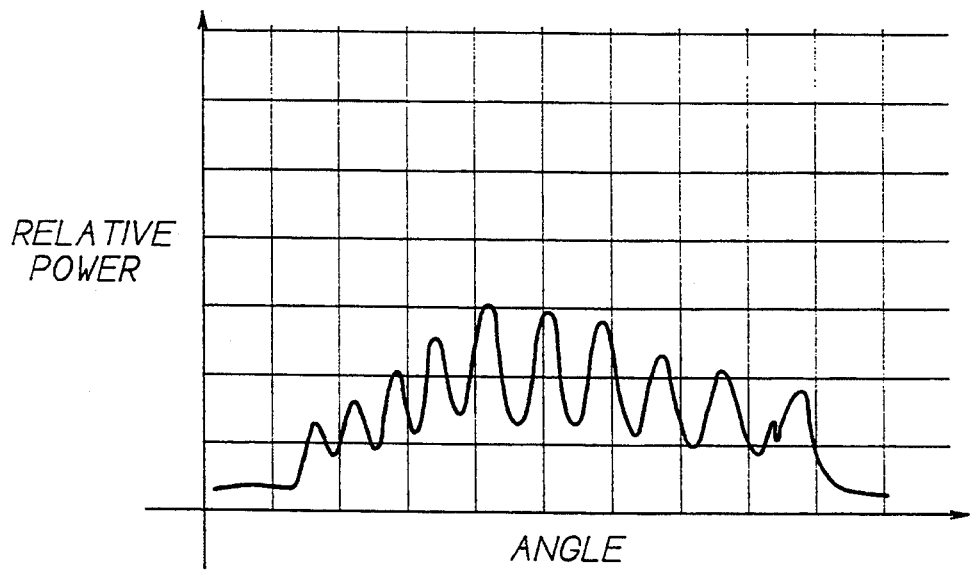
FIG. 4 is a graph of a standing wave interference pattern, in accordance with the present invention.
Figure 5:
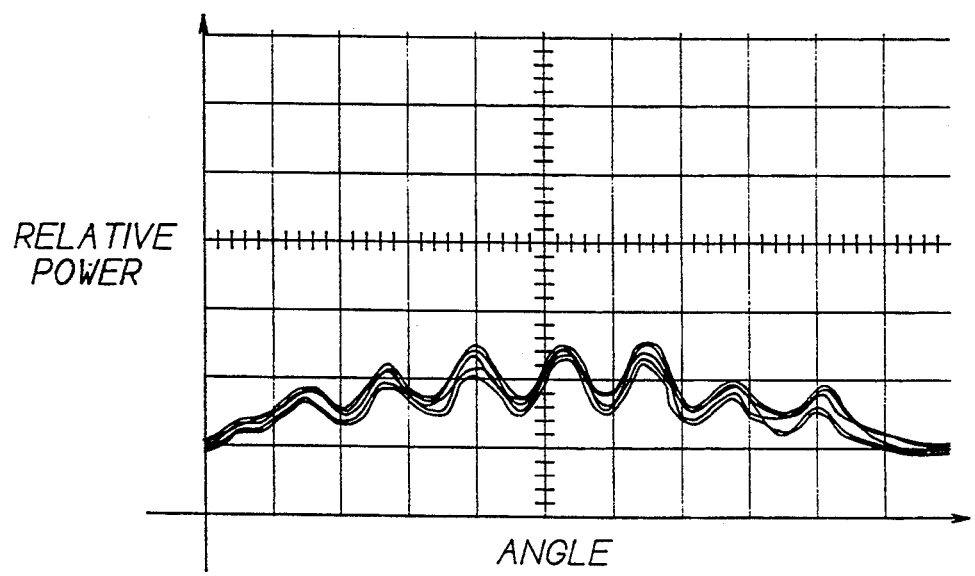
FIG. 5 is a graph of a plurality of sweeps across the standing wave interference pattern, in accordance with the present invention.

Referring now to FIGS. 2,4,5, to verify that phase locking was achieved, the light beams 346,348 were incident on a scanning mirror 360 which pivots about an axis 362 and provides a reflected light 364 through an aperture 365 onto a detector 366 located a predetermined distance from the mirror 360. The detector 366 provides an electrical output signal on a line 368 to an oscilloscope 370 which traced the intensity patterns in space as indicated in FIG. 4. To ensure the two laser cavities were phase-locked a piezoelectric tuner 370 (such as that discussed hereinbefore with FIG. 1) was attached to the fiber 312 and the voltage Vin varied until the interference pattern was as indicated in FIG. 4. FIG. 4 shows the aforementioned standing wave interference pattern which indicates that the beams 346,348 are phase-locked. Referring to FIG. 5, a plurality of (about 5) scans were performed at 10 second intervals and the interference pattern did not appreciably change nor shift showing that the coupling is substantially stable over time.

Also, instead of having N laser diodes, one for each fiber laser, a single laser pump may be used if desired. Further, the number of lasers which can be coupled is not limited, provided the amount of coupling is adequate for phase-lock to occur. Also, each of the pump light signals may be at a different wavelength and each gain medium may be different, provided the lasing wavelength for each fiber laser is the same.

Furthermore, the fibers 14,66–72 (FIG. 1), may be omitted and the pump light 12,58–64 incident directly on the reflective gratings 16,74–80 or pumped in any of the various ways discussed hereinbefore. Also, instead of Bragg gratings, any other reflectors, such as dichroic mirrors, may be used if desired for the cavity reflectors.

Also, the coupler 22 (FIG. 1) need not have the same number of input fibers 20,90–96 as output fibers 32–38 and common cavity fiber 30, and the power distribution of the input light beams 18,82–88 to the output fibers 32–38 and common cavity fiber 30, need not be the same as the power distribution of the feedback light 122 to the individual fibers 20,90–96.

Although the invention has been described and illustrated with respect to exemplary embodiments thereof, it should be understood by those skilled in the art that the foregoing and various other changes, omissions and additions may be made without departing from the spirit and scope of the invention.

We claim:

1. A coupled multiple output fiber laser, comprising:
   a plurality of individual optical cavity fibers allowing light to propagate therein;
   a plurality of reflection means, each disposed along a respective one of said plurality of individual cavity fibers, each for reflecting light at a lasing wavelength;
   a portion of each of said individual cavity fibers being doped with a predetermined gain dopant which allows lasing at said lasing wavelength and receiving pump light which excites said gain dopant to allow said lasing to occur;
   a plurality of output fibers;
   a common cavity fiber;
   optical coupling means, connected to said output fibers, said common cavity fiber, and said individual cavity fibers, for receiving light from each of said individual fibers, for coupling a predetermined amount of the light in each of said individual fibers to said plurality of output fibers and to said common cavity fiber, based on a first predetermined power distribution, the light in each of said output fibers exiting said fibers as respective output light beams;
   common cavity reflection means, disposed along said common cavity fiber, for providing a predetermined amount of reflected feedback light at said lasing wavelength back along said common cavity fiber and back into said coupling means sufficient to provide coupling of said individual cavity fibers;
   said coupling means for providing a distributed predetermined amount of said feedback light along each of said individual cavity fibers based on a second predetermined power distribution; and
   said distributed predetermined amount of said feedback light being incident on a corresponding one of said plurality of reflection means and said distributed predetermined amount of said feedback light at said lasing wavelength being reflected by said corresponding reflection means, thereby creating a plurality of coupled laser cavities each cavity comprising one of said plurality of reflection means and said common reflection means, each cavity lasing at said lasing wavelength, and each of said output beams being phase-locked.

2. The coupled multiple output fiber laser of claim 1 further comprising laser pump means, for providing said pump light.

3. The coupled multiple output fiber laser of claim 1 further comprising fiber stretching means for adjusting the length of at least one of said individual cavity fibers.

4. The coupled multiple output fiber laser of claim 1 wherein said individual cavity fibers are single spatial mode fibers.

5. The coupled multiple output fiber laser of claim 1 wherein said gain dopant is a rare-earth element.

6. The coupled multiple output fiber laser of claim 1 wherein at least two of said output light beams are incident on an optical element to redirect said output light beams.

7. The coupled multiple output fiber laser of claim 1 wherein each of said output light beams are incident on an associated optical element to redirect and focus said output light beams causing them to intersect at a predetermined region an to create an interference pattern.

8. The coupled multiple output fiber laser of claim 1 further comprising means for phase shifting at least one of said output light beams.

9. The coupled multiple output fiber laser of claim 1 wherein said common cavity feedback reflection means passes a predetermined amount of light incident thereon thereby providing an additional output light beam.

10. The coupled multiple output fiber laser of claim 9 further comprising control means for detecting said additional output beam and for controlling said stretching means.

11. A coupled multiple output fiber laser, comprising:
    a plurality of individual optical cavity fibers allowing light to propagate therein;
    a plurality of reflection means, each disposed along a respective one of said plurality of individual cavity fibers, each for reflecting light at a lasing wavelength;
    a portion of each of said individual cavity fibers being doped with a predetermined gain dopant which allows lasing at said lasing wavelength and receiving pump light which excites said gain dopant to allow said lasing to occur;
    at least one output fiber;
    a common cavity fiber;
    optical coupling means, connected to said at least one output fiber, said common cavity fiber, and said individual cavity fibers, for receiving light from each of said individual fibers, for coupling a predetermined amount of the light in each of said individual fibers to said at least one output fiber and said common cavity fiber, based on a first predetermined power distribution, the light in each output fiber exiting said fiber as respective output light beams;
    common cavity reflection means, disposed along said common cavity fiber, for providing a predetermined amount of reflected feedback light at said lasing wavelength back along said common cavity fiber and back into said coupling means sufficient to provide coupling of said individual cavity fibers, and for passing a predetermined amount of light incident thereon, thereby providing an additional output light beam;
    said coupling means providing a distributed predetermined amount of said feedback light along each of said individual cavity fibers based on a second predetermined power distribution; and
    said distributed predetermined amount of said feedback light being incident on a corresponding one of said plurality of reflection means and said distributed predetermined amount of said feedback light at said lasing wavelength being reflected by said corresponding reflection means, thereby creating a plurality of coupled laser cavities each cavity comprising one of said plurality of reflection means and said common reflection means, each cavity lasing at said lasing wavelength, and each of said output beams being phase-locked.

12. The coupled multiple output fiber laser of claim 11 further comprising laser pump means, for providing said pump light.

13. The coupled multiple output fiber laser of claim 11 further comprising fiber stretching means for adjusting the length of at least one of said individual cavity fibers.

14. The coupled multiple output fiber laser of claim 11 wherein said individual cavity fibers are single spatial mode fibers.

15. The coupled multiple output fiber laser of claim 11 wherein said gain dopant is a rare-earth element.

16. The coupled multiple output fiber laser of claim 11 wherein at least two of said output light beams are incident on an optical element to redirect said output light beams.

17. The coupled multiple output fiber laser of claim 11 wherein each of said output light beams are incident on an associated optical element to redirect and focus said output light beams causing them to intersect at a predetermined region and to create an interference pattern.

18. The coupled multiple output fiber laser of claim 11 further comprising means for phase shifting at least one of said output light beams.

19. The coupled multiple output fiber laser of claim 18 further comprising control means for detecting said additional output beam from said common cavity reflection means and for controlling said stretching means.

* * * * *